(12) United States Patent
Nemeth

(10) Patent No.: US 8,571,021 B2
(45) Date of Patent: Oct. 29, 2013

(54) PACKET BASED DATA TRANSMISSION WITH REDUCED DATA SIZE

(75) Inventor: Jozsef G. Nemeth, Budapest (HU)

(73) Assignee: Microchip Technology Incorporated, Chandler, AZ (US)

( * ) Notice: Subject to any disclaimer, the term of this patent is extended or adjusted under 35 U.S.C. 154(b) by 736 days.

(21) Appl. No.: 12/757,709

(22) Filed: Apr. 9, 2010

(65) Prior Publication Data

US 2010/0315965 A1  Dec. 16, 2010

Related U.S. Application Data

(60) Provisional application No. 61/185,635, filed on Jun. 10, 2009.

(51) Int. Cl.
*H04L 12/28* (2006.01)

(52) U.S. Cl.
USPC .......................................................... 370/389

(58) Field of Classification Search
USPC ......... 370/252, 310, 428, 465, 467, 468, 389, 370/392, 393, 471, 474, 475, 476, 241, 313
See application file for complete search history.

(56) References Cited

U.S. PATENT DOCUMENTS

| 5,289,471 A | * | 2/1994 | Tanaka et al. ................. 370/244 |
| 6,115,394 A | * | 9/2000 | Balachandran et al. ...... 370/477 |
| 2005/0271150 A1 | * | 12/2005 | Moore et al. ................. 375/259 |
| 2008/0310339 A1 | * | 12/2008 | Kano ............................ 370/315 |

FOREIGN PATENT DOCUMENTS

| EP | 1701271 A1 | * | 9/2006 |
| EP | 1 988 655 A1 | | 11/2008 |
| EP | 1988655 A1 | * | 11/2008 |
| WO | 99/45678 | | 9/1999 |

OTHER PUBLICATIONS

International PCT Search Report, PCT/US2010/037951, 14 pages, mailed Oct. 5, 2010.

* cited by examiner

*Primary Examiner* — Anh Ngoc Nguyen
(74) *Attorney, Agent, or Firm* — King & Spalding L.L.P.

(57) ABSTRACT

In a method for transmitting data in a packet-based transmission system, a packet is assembled by including control information and payload data, wherein the control information includes a destination address; redundancy information is calculated using the packet; wherein the destination address is stripped from the packet and the redundancy information is added to the packet and a control bit in the packet is set indicating that no destination address is included in the packet. The thus altered packet is transmitted.

40 Claims, 5 Drawing Sheets

A) TRANSMITTER CONSRUCTS THE FRAME:

'DAddr present' = False

B) FRAME SENT ON AIR WITHOUT THE DADDR FIELD

C) RECEIVER CHECKS THE CRC USING ITS OWN NODE ADDRESS

A) TRANSMITTER CONSRUCTS THE FRAME:

'DAddr present' = False

B) FRAME SENT ON AIR WITHOUT THE DADDR FIELD

C) RECEIVER CHECKS THE CRC USING A PRECOMPUTED SEED

```
10101)11001001110000(1111100001
      10101
      11000
      10101
      11010
      10101
      11111
      10101
      10101
      10101
      00001
      00000
      00010
      00000
      00100
      00000
      01000
      00000
      10000
      10101
      ─────
       0101
```

PACKET BASED DATA TRANSMISSION WITH REDUCED DATA SIZE

CROSS-REFERENCE TO RELATED APPLICATIONS

This application claims the benefit of U.S. Provisional Application No. 61/185,635 filed on Jun. 10, 2009, entitled "INFERRED DESTINATION ADDRESSING IN A PACKET-BASED WIRELESS PROTOCOL", which is incorporated herein in its entirety.

TECHNICAL FIELD

The present disclosure relates to a method and device for packet-based data transmissions, in particularly, to a wireless packet protocol.

BACKGROUND

Packet-based data transmission uses various layers in which data and associated control information, such as address identifiers for transmitter and receiver, data length, redundancy information, etc., is transmitted. Packet-based data transmission is used in a wide variety of protocols. There exist many protocols in which for transmission of specific data the additional control information is larger than the data payload. Thus, transmission of data can be slowed down significantly. In particular, in wireless transceivers, e.g., an 802.15.4 transceiver, where transmission of packet bytes is a power expensive operation, reducing the number of bytes transmitted by the wireless device has a direct correlation to the operational power used by the wireless device. In many battery-powered wireless transceiver applications (e.g., remote controls, game consoles, etc.) the message framing overhead can constitute an important proportion of the radio duty cycle, thereby having a significant impact on the battery-life.

SUMMARY

There exists a need for a more efficient way of packet-based data transmission.

According to an embodiment, a method for transmitting data in a packet-based transmission system may have the steps of: assembling a packet by including control information and payload data, wherein the control information includes a destination address; calculating redundancy information using the packet; stripping the destination address from the packet and adding the redundancy information to the packet, wherein a control bit in the packet is set indicating that no destination address is included in the packet; and transmitting the packet.

According to a further embodiment, the control bit in the packet indicating that no destination address is included in the packet can be set before calculating the redundancy information. According to a further embodiment, the redundancy information may be calculated using a cyclic redundancy check (CRC). According to a further embodiment, during assembling the destination address can be included in a frame header. According to a further embodiment, during assembling the destination address can be the first information included in the frame header. According to a further embodiment, the packet can be transmitted wirelessly. According to a further embodiment, the method may operate with a 802.15.4 standard.

According to another embodiment, a method for receiving data in a packet-based transmission system may have the steps of: receiving a packet including control information, payload data and transmitter redundancy information; determining whether a destination address is included in the control information; if no destination address is included then inserting an address into the control information and removing the transmitter redundancy information from the packet; calculating receiver redundancy information using the packet; and comparing the receiver redundancy information and the transmitter redundancy information and if true, accepting the packet and otherwise discarding the packet.

According to a further embodiment, the redundancy information can be calculated using a cyclic redundancy check (CRC). According to a further embodiment, the step of determining can be performed by checking whether a predetermined bit is set in a frame header. According to a further embodiment, the method may have the step of calculating a CRC seed using the inserted address. According to a further embodiment, the transmitter redundancy information can be stored. According to a further embodiment, the packet can be transmitted wirelessly. According to a further embodiment, the method may operate with a 802.15.4 transmission standard.

According to yet another embodiment, a transmitter may comprise a message assembly unit; a redundancy information calculation unit coupled with the message assembly unit; and a transmission unit coupled with the message assembly unit, wherein the message assembly unit is operable to assemble a packet by including control information and payload data, wherein the control information includes a destination address; to forward the packet to the redundancy information calculation unit for calculating a redundancy information, to strip the destination address from the packet and to add the redundancy information to the packet, to set a control bit in the packet indicating that no destination address is included in the packet, and to forward the packet to the transmission unit.

According to a further embodiment, the transmitter may be operable to set the control bit in the packet indicating that no destination address is included in the packet before forwarding the packet to the redundancy information calculation unit. According to a further embodiment, the redundancy information calculating unit can be a cyclic redundancy check (CRC) unit. According to a further embodiment, the transmission unit can be a wireless transmission unit. According to a further embodiment, the wireless transmission unit may operate according to a 802.15.4 standard. According to a further embodiment, the transmitter can be part of a transceiver in an integrated circuit having an I²C interface. According to a further embodiment, the transmitter may further comprise a battery as a power source.

According to yet another embodiment, a receiver may comprise a message reconstruction unit; a redundancy information calculation unit coupled with the message assembly unit; and a receiving unit coupled with the message reconstruction unit, operable to receive a packet including control information, payload data and transmitter redundancy information, wherein the message reconstruction unit is operable to determine whether a destination address is included in the control information; if no destination address is included, then the message reconstruction unit is operable to insert an address into the control information and removing the transmitter redundancy information from the packet; to forward the packet to the redundancy calculation unit for calculating a receiver redundancy information; and to compare the receiver redundancy information and the transmitter redundancy information and if true, to accept the packet and otherwise to discard the packet.

According to a further embodiment, the redundancy information calculation unit can be a cyclic redundancy check (CRC) unit. According to a further embodiment, the message reconstruction unit may determine whether a destination address is included by checking whether a predetermined bit is set in a frame header of the packet. According to a further embodiment, the CRC unit can be operable to calculate a CRC seed using the inserted address before a packet is fully received. According to a further embodiment, the receiver may further comprise memory to store the transmitter redundancy information. According to a further embodiment, the receiver may further comprise memory to store the inserted address. According to a further embodiment, the receiving unit can be a wireless receiving unit. According to a further embodiment, the wireless receiving unit may operate with a 802.15.4 standard. According to a further embodiment, the receiver can be part of a transceiver in an integrated circuit having an I²C interface. According to a further embodiment, the receiver may further comprise a battery as a power source.

According to yet another embodiment, a transceiver may comprise a redundancy information calculation unit; a message assembly and reconstruction unit coupled with the redundancy information calculation unit; a transceiver unit coupled with the message assembly unit for transmitting and receiving packets, wherein the message assembly and reconstruction unit is operable for transmission: to assemble a packet by including control information and payload data, wherein the control information includes a destination address; to forward the packet to the redundancy information calculation unit for calculating a redundancy information, to strip the destination address from the packet and to add the redundancy information to the packet, to set a control bit in the packet indicating that no destination address is included in the packet; and to forward the packet to the transmission unit; and further operable for reception: to determine whether a destination address is included in control information of a received packet; if no destination address is included, to insert an address into the control information and to remove a received redundancy information from the packet; to forward the packet to the redundancy calculation unit for calculating a receiver redundancy information; and to compare the receiver redundancy information and the received redundancy information and if true, to accept the packet and otherwise to discard the packet.

According to a further embodiment, the redundancy information calculating unit can be a cyclic redundancy check (CRC) unit. According to a further embodiment, the transceiver unit can be a wireless transceiver unit. According to a further embodiment, the wireless transceiver unit may operate according to a 802.15.4 standard. According to a further embodiment, the transceiver may further comprise an I²C interface. According to a further embodiment, the transceiver may further comprise a battery as a power source. According to a further embodiment, the transceiver may further comprise memory to store the received redundancy information. According to a further embodiment, the transceiver may further comprise memory to store the inserted address. According to a further embodiment, the transceiver may be operable to set the control bit in the packet indicating that no destination address is included in the packet before forwarding the packet to the redundancy information calculation unit.

BRIEF DESCRIPTION OF THE DRAWINGS

A more complete understanding of the present disclosure and advantages thereof may be acquired by referring to the following description taken in conjunction with the accompanying drawings wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Therefore in packet-based communication, in particular in proprietary wireless communication scenarios mentioned herein, it is desired to devise a communications protocol that allows savings on radio transmission duty cycle and reduction of packet framing overhead so as to reduce the operational power used by the wireless device by reducing the number of bytes transmitted.

In wireless and wired communication networks, packet-based data transmission may include the address identifier of the transmitting and receiving unit as control information. Thus, on receipt a receiver can immediately check whether the transmission was meant to be received by this unit and if not, discards the received information. According to the teachings of this disclosure, a decrease in the packet or frame length for wireless protocols is achieved omitting the destination address, for example, by inferring the destination address of the packet or frame. By inferring the destination address from other information in the packet or frame such as a redundancy or security information, the destination address can be omitted from each packet or frame, and thereby reducing the overall packet or frame length. For example, a cyclic redundancy check (CRC) can be used to generate additional information which infers the destination address as will be explained in more detail below. This reduction in data length can be typically ten percent in the targeted application domain. Thus, transmission can be faster and most importantly, for wireless transmission in battery operated systems, less energy is necessary to transmit the data. This can be advantageous in devices that transmit very few but constantly data, such as a wireless input device including a wireless mouse and keyboard. In cases of a mouse or keyboard the payload is often significantly smaller than the control information in a packet or frame. Thus, reducing the control information can be very beneficial for speed and energy savings.

Figure 1:
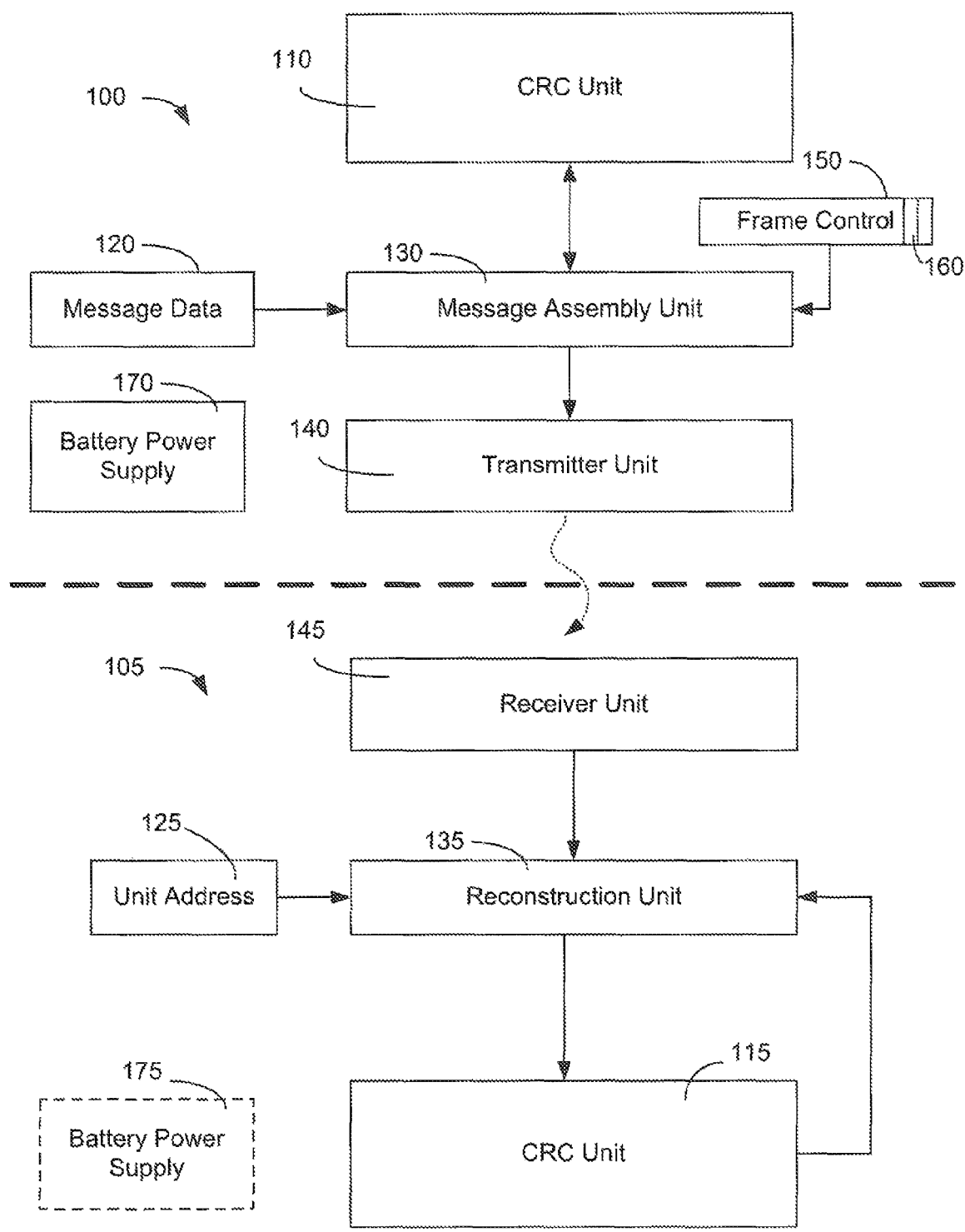
FIG. 1 is a block diagram of system with a transmitter and a receiver according to an embodiment.

FIG. 1 shows a system 100, 105 for packet-based data transmission using a cyclic redundancy check (CRC) unit 110 to add additional redundancy to the transmitted information. Other redundancy methods may be used as will become apparent from the present disclosure. A message assembly unit 130 can be provided that receives the data payload 120 and frame control information 150 as well as other information (not shown). Frame control information 150 may include a bit 160 which when set indicates to the message assembly unit 130 that a packet or frame with or without the destination address is to be generated and transmitted. Frame control information 150 may include a plurality of other control bits that control how the message assembly unit configures the data to be transmitted. These may include, broadcast modes, acknowledgement mode, etc. The message assembly unit 130 is coupled with a transmitter unit 140 for wired or wireless transmission. FIG. 1 also shows a battery power supply unit 170 indicating that the transmitter can be a mobile wireless device.

On the receiver side, a wired or wireless receiver 145 is coupled with a reconstruction unit 135. According to an embodiment, the receiver unit 135 receives the unit address for example from a register or memory 125. The reconstruction unit 135 is coupled with a CRC unit 115 which might be identical to the CRC unit 110 of the transmitter 100. Again, the receiver may also be battery powered as indicated by dotted box 175. The receiver 105 receives a message and decodes the frame control information to determine the configuration of the received message.

It will be appreciated, that transmitter 100 and receiver 105 can be combined to form a transceiver. In such an embodiment, only a single CRC unit is needed and can be shared by the respective receiving and transmitting circuitry.

Using a CRC method generally requires the data including control information and data payload to be processed by a CRC-unit 110 using a pre-defined generator polynomial as will be explained below in more detail. Then, the result of a CRC calculation is generally added, for example, appended, to the data to be transmitted. The receiver 105 who also knows the generator polynomial applies the same algorithm to the data and compares the result with the result that has been added to the transmission. Thus, a correct transmission can be verified on the receiver side. In case the transmission was disturbed such that transmission data have been corrupted, the receiver will generate a different result and then discard the received packet or frame and request re-transmission.

The CRC calculation can be performed using a Linear Feedback Shift Register (LFSR) as will be explained below in more detail. However, it may be more cycle-efficient to calculate the CRC with a byte-oriented method which only computes the remainder. To keep in step with the reception, this can be beneficial according to various embodiments.

According to an embodiment, this redundancy check is used to reduce the amount of transmitted data. For example, if bit 160 is set to "0", this will indicate to the message assembly unit 130 that no destination address is to be included in the packet or frame. In the data stream to be transmitted, the message assembly unit 130, for example, includes this bit in the frame header. Thus, a receiver will be able to recognize immediately whether a destination address is present or not. If this bit is set to "0", the message assembly unit 130 will then drop the destination address from the transmitted packet or frame and lets the acceptance decision at the receiver be based solely on the received Frame Check Sequence which in the embodiment shown in FIG. 1 is a CRC. As mentioned above, a "Destination Address present" flag is reserved in a frame header (FrameControl Field) and set to False (0) to signal the inferred addressing mode. The transmitter calculates the CRC over the complete frame including the destination address but then drops the Destination Address (DAddr) before the packet or frame is transmitted. Thus, the destination address can be inferred from the CRC result as will be explained below.

The receiver 105 checks the CRC by inserting its own address as will be explained below. In the case of a match the frame is accepted, otherwise it is silently discarded. This way CRC filtering takes over the role of Address-Match filtering. As will be appreciated, any other redundancy check or even a security coding that includes the destination address into an algorithm that generates a known result can be used.

In particular, in wireless systems, since the framing overhead becomes shorter, the duty-cycle of the radio decreases and the throughput gets increased. Since the energy consumed by sending a single byte can outweigh the energy budget of hundreds of MCU byte-operations, the impact on battery life can be significant.

Figure 2:
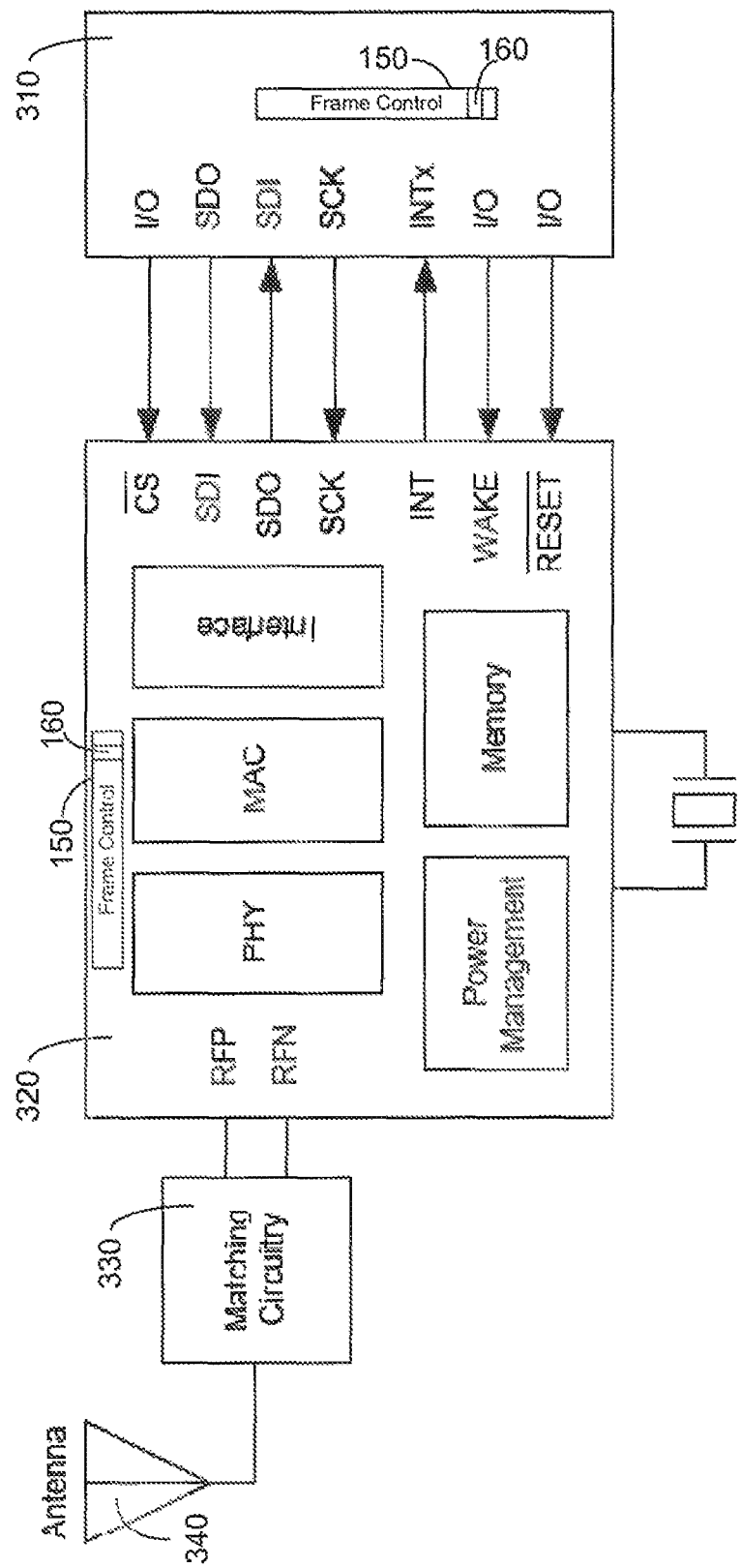
FIG. 2 is a block diagram of an transceiver according to an embodiment.

FIG. 2 shows another embodiment with a transceiver device 320 coupled with a microcontroller or processor 310 via a serial interface and via matching circuitry 330 with an antenna 340. The transceiver 320 can be designed to operate with a wireless transmission protocol, for example according to the 802.15.4 standard. To this end, the transceiver device comprises all necessary elements such as media access control (MAC) layer, physical layer PHY, interface, power management and memory, etc., to transmit and receive according to the standard. The additional functionality according to various embodiments can be either implemented in the transceiver device 320 or in the microcontroller 310 as indicated by frame control register 150 with destination address indication bit 160. If a CRC unit is used to perform the redundancy check, such a unit is implemented in the respective device 320 as, e.g., shown in FIG. 1 or in the microcontroller 310. In case of a microcontroller or processor, the CRC can also be performed by software, thus, not requiring the additional hardware. The transceiver can be an integrated circuit device that may be coupled with a microcontroller 310 by means of an I2C interface and may be in particular battery operated.

Figure 3:
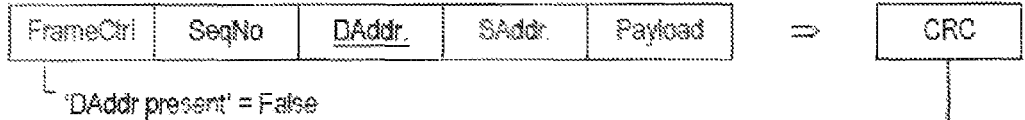
FIGS. 3 and 4 show different embodiment of packet-based data transmission.
Figure 3:
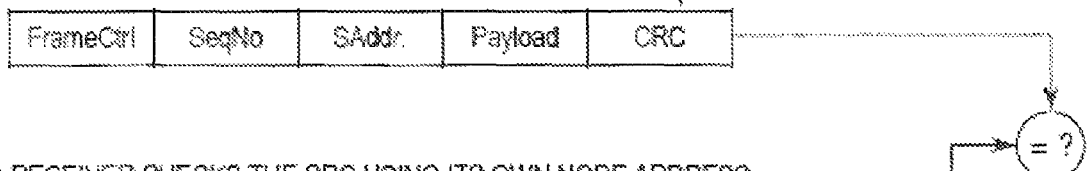
Figure 3:
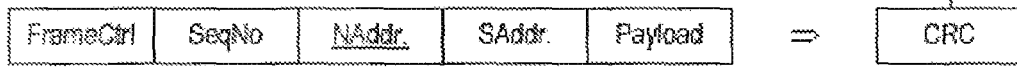
Figure 4:
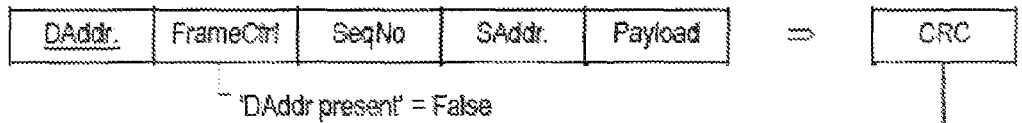
Figure 4:
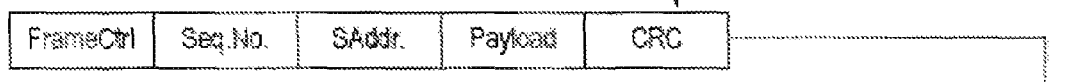
Figure 4:
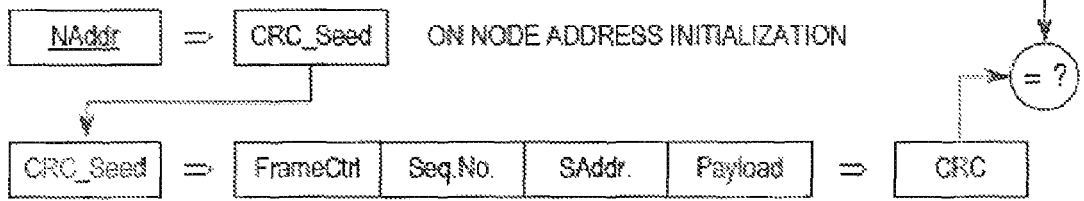

FIGS. 3 and 4 show different modes of implementation. According to FIG. 3, the transmitter 100 or transceiver constructs the frame such that frame control information FrameCtrl is concatenated with a sequential number SeqNo, a destination address DAddr, a Source address SAddr and the data payload. As can be seen a packet or frame generally consists of control information including the destination address and payload data. This frame is then fed to the CRC unit 110 which calculates a result. The result is then appended to the frame and most importantly if the destination address bit 160 is set to "0", the destination address DAddr is stripped from the frame as shown in frame B in FIG. 3. Thus, depending on the transmission type, the control information includes whatever control data is necessary but without the destination address. The receiver receives frame B, stores the transmitted CRC result and strips it from the frame and inserts its own address NAddr, here between SeqNo and Saddr as shown in frame C in FIG. 3. This frame C is then input into the CRC unit 115 on the receiver side which calculates the CRC result. The receiver side CRC result is then compared with the previously stored transmitter CRC result. If both are the same, then the transmitted frame was designated for the receiver and the receiver can further process the data by storing and/or processing it.

FIG. 4 shows another possible embodiment which provides for improved processing speed in particular when using a CRC algorithm. In this embodiment the Destination Address DAddr is moved to the head of the CRC calculation in the inferred addressing mode. This can be done without penalty since DAddr will not be sent. The benefit is now that the receiver can initialize the CRC computation with a vector-pre-computed from its own address NAddr once at initialization. This can be done before any data has been received. Thus on frame arrival, CRC calculation is kept in step with reception in particular as the CRC algorithm processes its result by shifting the received data bits into the CRC engine which will be explained in more detail below.

Even though in some embodiments frames can be discarded only after the last byte has been received, thus, increasing the power consumption in nodes not addressed by the frame, generally substantially no penalty occurs because high duty-cycle wireless devices are powered to be active most of the time anyway. Whereas low duty-cycle nodes use polling or other synchronization methods for reception, which minimizes the time window for misaddressing. Meanwhile the transmit side always saves power.

In very rare instances two randomly chosen addresses may produce the same CRC initialization vector thus creating an addressing conflict. But assuming a 16-bit CRC, this case has very low probability, and cannot even occur if the two addresses differ only over a 16-bit interval. Other protocol elements may be used to resolve the issue. Specific error patters can result in misaddressing. But this is equivalent to the case when an error goes undetected. Therefore, applications are supposed to cope with it.

According to a specific example embodiment of this disclosure a 1-bit Destination Present field in the packet or frame may determine if a destination address exists in the MAC header. When this bit is set, the destination address with length defined by the transceiver or the networking protocol is present in the MAC header. When this bit is cleared, the destination address does not show up in the MAC header. Absence of a destination address may happen in other transmissions. For example, in an acknowledgment packet, there is no destination address present. When the packet or frame type is 0b10, the Destination Present bit must be cleared as it is not needed for an acknowledgement. An entirely different transmission mode also does not require a destination address, namely, a broadcast packet, as such a transmission is intended to be received by any receiver. Thus, when the Broadcast bit is set, the Destination Present bit must also be cleared and no destination address is included. Finally, as explained above, the destination address can be omitted if inferred destination is used. When inferred destination mode is used, the destination address is still used when calculating CRC, but not transmitted. When the transceiver receives the packet or frame, it will check the CRC with its own address added. A CRC error in this case is either because of transmission error or the message is not for this receiving node.

The following disclosure explains the CRC algorithm in more detail. However, as stated above, other methods for checking a redundancy may be used and the present invention is not limited in using the CRC method.

CRC is one of the most versatile error checking algorithms used in various digital communication systems. CRC stands for Cyclic Redundancy Code Check or simply Cyclic Redundancy Check. Most of the popular communication protocols, like CAN, USB, IrDA®, SDLC, HDLC and Ethernet, employ CRC for error detection. Normally, for the error detection in digital communication systems, a checksum is computed on the message that needs to be transmitted. The computed checksum is then appended at the end of the message stream and is transmitted. At the receiving end, the message stream's checksum is computed and compared with the transmitted checksum. If both are equal, then the message received is treated as error free.

CRC works in a similar way, but it has greater capabilities for error detection than the conventional forms. Different CRC polynomials are employed for error detection. The size of CRC depends upon the polynomial chosen. A dedicated hardware module can be used to implement a CRC. All CRC calculations are carried out in the GF (2) (Galois field for 2 elements); 'field' is something in which perform addition, subtraction, multiplication and division can be performed and the '2 elements' specifies the field which has only two values, either '1' or '0'. This is analogous to the binary field or Modulo 2. Modulo 2 arithmetic uses binary addition or subtraction with no carry, which is equivalent to the XOR operation. Multiplication and division are similar to binary multiplication and division, respectively. The message to be transmitted is treated as a polynomial and divided by an irreducible (prime) polynomial known as the 'generator polynomial'. The degree of the generator polynomial should be less than that of the message polynomial. For an 'n+1' bit generator polynomial, the remainder will not be greater than 'n' bits. The CRC checksum of the data is the binary equivalent of the remainder after the division.

If a message of 'M' of 'k' bits and generator polynomial 'G' of 'n+1' bits is considered, dividing the message by the generator will yield a remainder 'R' of 'n' bits. Therefore, M=GQ+R; where Q is the quotient obtained when M is divided by G.

$$M = G \cdot Q + R$$

$$M + R = GQ = M - R \qquad (1)$$

(Since addition and subtraction are equivalent in Modulo 2 arithmetic.) Now, M+R=GQ, where the checksum is embedded into the message (M+R). Here, by adding the checksum to the message, the last 'n' bits of the message are corrupted. Instead of embedding the checksum in the message, the checksum is appended to the message, thus avoiding the corruption of message bits. When the remainder is appended to the message for transmission, it is equivalent to shifting the message bits by the number of remainder bits. Initially, the message stream is appended with zeros. After the checksum calculation, zeros are replaced with the actual checksum computed, which is the binary equivalent of the remainder of the division. The number of appended zeros is dependent on the degree of generator polynomial.

Appending 'n' zero bits to the message polynomial is equivalent to multiplying the polynomial by $2^n$. Equation 2 explains this:

$$M = G \cdot Q + R$$

$$M2^n = Q^1 \cdot G + R^1$$

$$M2^n + R^1 = Q^1 \cdot G \qquad (2)$$

From Equation 2, it can be noticed that G is the exact multiple of (M $2^n$+R'). At the receiving end, if G is an exact multiple of the message, then the message is not corrupted.

In the binary field, data is in the form of a polynomial (i.e., if the data field is '11101', then it can be represented in the polynomial form by writing as $X^4+X^3+X^2+X^0$). Generally, a generator polynomial is irreducible and the Most Significant bits and the Least Significant bits are always '1'. Some generator polynomials and their interpretation are shown below in Table 1.

TABLE 1

| Type | Polynomial | Binary | Hex |
| --- | --- | --- | --- |
| CRC. 12: | $X12 + X11 + X3 + X2 + X + 1$ | 1100000001111 | :180Fh |
| CRC. 16: | $X16 + X15 + X2 + 1$ | 11000000000000101 | :11021h |
| CRC. CCITT: | $X16 + X12 + X5 + 1$ | 10001000000100001 | :18005h |

Figures 5, 6:
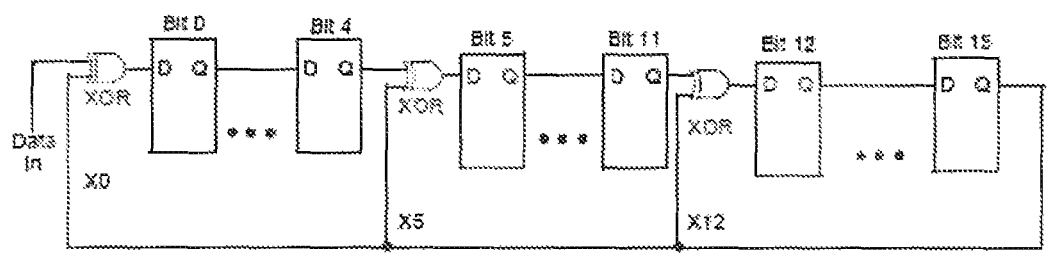
FIG. 5 shows elements of a CRC engine.
FIG. 6 shows an exemplary CRC calculation.

As shown in an exemplary calculation in FIG. 5, the following assumes a message polynomial is '1100100111' and a generator polynomial is '10101' (n+1=5). For the CRC computation purpose, four (n) zeros are appended to the message polynomial and divide the message polynomial by the generator polynomial.

From FIG. 5, it can be inferred that in every step the upper most bit of the result is shifted out. These shifted out bits form the quotient of the polynomial division. The remainder of the polynomial division is the CRC of the message. With the given division example, it can be deduced that:

If the upper most bit of a message polynomial is '1', then a XOR with the generator polynomial is performed. Then, this message polynomial is shifted by 1 bit.

If the upper most bit is a '0', perform a shift operation by 1 bit on the message polynomial (because XOR with zeros results in the same polynomial).

With the above inferences, an algorithm for CRC computation can be defined as:

1. If the Most Significant bit is '1', shift the message bits by 1 position and perform a XOR operation.
2. If the Most Significant bit is '0', shift the message bits by 1 position.
3. If there are still more bits, then repeat from step 1.

It can be noted that the shift operation is performed first and then the XOR operation. When the generator polynomial is 'n+1' bits, the Most Significant bit is always '1'. Since it is always '1', it can be made redundant or need not be indicated. So, effectively, 'n' bits can be used to represent the generator polynomial instead of 'n+1' bits. If '10101' is assumed as the generator polynomial, since the MSb is the redundant bit, the actual bit length is 4 bits instead of 5 bits. Actual XOR operation should be performed when the shift register MSb is '1'; since the 5th bit is not considered, the 4th bit is observed, and when it is logic '1', it is shifted by 1 more bit and perform the XOR operation. Therefore, a shift operation is performed first before the XOR operation.

The above algorithm can be used for the CRC computation both in hardware and software. In hardware, CRC calculation is done using a Linear Feedback Shift Register (LFSR). The LFSR constitutes of D-flip-flops and XOR gates as shown for example in FIG. 6, the number of shift registers is equal to the degree of the selected generator polynomial. The XOR gates form a feedback from the LFSR register to act as a tap controller for the polynomial. After the entire message bits have shifted out, the bits which have been shifted out form the quotient and the remaining bits in the shift register form the remainder.

CRC is a simple and robust operation which is accomplished using a shift register in Modulo 2 arithmetic. This is because Modulo 2 calculation is simply realized by XORing numbers, hence, it is very popular. In this type of CRC operation, both the remainder and the quotient can be obtained. Since, the quotient in CRC computation is not needed, it is neglected, and only the remainder is taken from the LFSR register. At the receiving end, the message stream plus the checksum are treated as the message for CRC computation. If the result is zero, then the received message, along with the CRC, is error free, else the message stream is corrupted.

Figure 7:
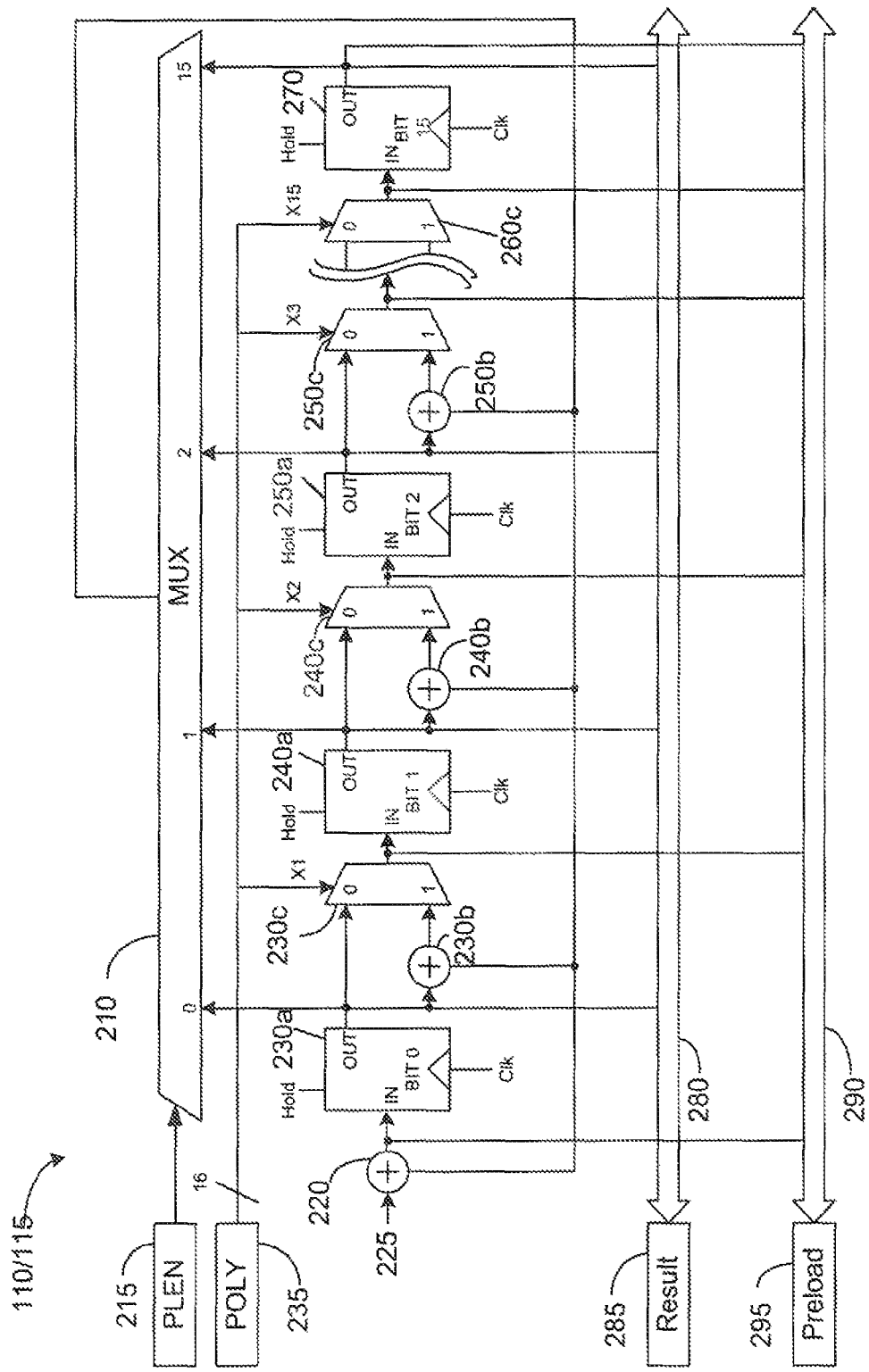
FIG. 7 shows generic elements of a CRC engine.

According to various embodiments, a programmable CRC unit can be integrated into a wireless transceiver or a microcontroller. FIG. 7 shows an embodiment of CRC engine 110/115 that can be used, for example, within a wireless transmitter, receiver or transceiver as shown in FIGS. 1 and 2. A TAP register is formed by shift register cells 230a, 240a, 250a, . . . 270 which are controlled by clock signal Clk and hold signal Hold. The embodiment shown in FIG. 7 depicts certain sections of a 16 bit CRC generator. However, other configurations with 8 or 32 bits or any other size can be easily realized. The input of cell 230a is coupled with the output of XOR gate 220 which receives the serial data input signal 225 and the feedback output signal from multiplexer 210. The output of cell 230a is coupled with the first input of multiplexer 210, the first input of select multiplexer X1, the first input of XOR gate 230b, and the CRC Read bus 280. The second input of XOR gate 230b is coupled with the feedback output signal from multiplexer 210 and the output of XOR gate 230b with the second input of select multiplexer 230c. The output of select multiplexer 230c is coupled with the input of the next shift cell 240a and with the CRC Write bus 290. The next shift cells 240a . . . 250a are provided with respective XOR gates 240b . . . 250b and select multiplexers 240c . . . 260c and connected in the same way as cell 230a to respective inputs of multiplexer 210 and busses 280 and 290. The output of the last cell 270 is coupled with the last input of multiplexer 210, and CRC Read and Write busses 280 and 290. Multiplexer 210 is controlled by polynomial length register 215 PLEN. Multiplexers 230c . . . 260c are controlled by the polynomial register 235 POLY. CRC Read bus 280 can be coupled with register 285 containing the result and CRC Write bus 290 can be coupled to register 295 containing the preload value.

The multiplexer 210 is used to select the feedback point and effective length of the CRC generator through register PLEN. Register 215 controls the length of the CRC generator 200 and is user selectable. The feedback data which is provided by the output of multiplexer 210 is XOR'ed with the data currently in the CRC shift register 230a, 240a, 250a, 270 by means of the XOR gates 230b . . . 260c. Select multiplexers 230c, 240c, 250c and 260c are used to select whether the XOR data or the previous data in the shift register 230a, 240a, 250a, 270 is shifted on the next clock. Polynomial Register 235 is used to configure which bits are shifted through and which bits take the feedback data XOR'ed with the previous data in the CRC generator which contains the X1 input of multiplexers 230c, 240c, 250c and 260c. CRC Write bus 290 can be used to pre-load the CRC flip-flops 230a, 240a, 250a, 270 by means of preload register 295. CRC Read bus 280 can be used to read the value of the CRC generator. Data 225 is provided by the output of multiplexer 160 and shifted into the CRC through XOR gate 220. The arrangement shown in FIG. 7, thus, provides for a linear feedback shift register (LFSR) with various configurations based on tap/XOR location in a LFSR-style chain.

The CRC engine can be a standard serial shifting CRC engine as for example shown in FIG. 7 with feedforward and feedback points configurable through multiplexer settings. However, any other type of CRC engine may be used. The Generator Polynomial can be programmed using the 16-bits. Writing a '1' into a flip-flop 230a, 240a, 250a, 270 enables the XOR gate 220, 230b, 240b, 250b associated with that element of the polynomial. The polynomial length register 215 signals the length of the polynomial, and switches a multiplexer 210 to dictate the tap from which the feedback comes. The data width register 180, 190 configures the width of the data word and affects the number of clocks after which the FIFO 130 advances to the next data word. The result of the CRC calculation can be obtained by reading the holding flip-flops 230a, 240a, 250a, 270 through the CRC Read Bus 280 and stored in register 285. The data width can be configured independent of the polynomial length using the data width configuration bits in a respective register. There are no restrictions on the relationship between the data width and the polynomial length. If the data is wider than the polynomial length, extra clocks will shift the wider data through the polynomial and vice versa.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for transmitting data in a packet-based transmission system, comprising the steps of:
    assembling a packet by including control information and payload data, wherein the control information includes a destination address;
    calculating redundancy information using said assembled packet;
    stripping said destination address from said packet after the redundancy information has been calculated, and
    adding the redundancy information to the packet,
    setting control bit in the packet indicating that said destination address is not included in the packet; and
    transmitting the packet.

2. The method according to claim 1, wherein the control bit in the packet indicating that said destination address is not included in the packet is set before calculating the redundancy information.

3. The method according to claim 1, wherein the redundancy information is calculated using a cyclic redundancy check (CRC).

4. The method according to claim 1, wherein during assembling the destination address is included in a frame header.

5. The method according to claim 1, wherein during assembling the destination address is the first information included in a frame header.

6. The method according to claim 1, wherein the packet is transmitted wirelessly.

7. The method according to claim 6, wherein the method operates with a 802.15.4 standard.

8. A method for receiving data in a packet-based transmission system, wherein a receiver has an associated address, the method comprising the steps of:
    receiving a packet including control information, payload data and transmitter redundancy information;
    determining whether a destination address is included in said control information;
    if said destination address is not included then inserting the associated address into the control information and removing said transmitter redundancy information from said packet;
    thereafter calculating receiver redundancy information using said packet; and
    comparing the receiver redundancy information and the transmitter redundancy information and if they are identical, accepting said packet and otherwise discarding said packet.

9. The method according to claim 8, wherein the redundancy information is calculated using a cyclic redundancy check (CRC).

10. The method according to claim 8, wherein determining whether the destination address is included is performed by checking whether a predetermined bit is set in a frame header.

11. The method according to claim 9, further comprising the step of calculating a CRC seed using the inserted associated address.

12. The method according to claim 8, wherein the transmitter redundancy information is stored.

13. The method according to claim 8, wherein the packet is transmitted Wirelessly.

14. The method according to claim 13, wherein the method operates with a 802.15.4 transmission standard.

15. A transmitter comprising:
    a message assembly unit;
    redundancy information calculation unit coupled with said message assembly unit; and
    a transmission unit coupled with the message assembly unit,
    wherein the message assembly unit is configured
    to assemble a packet by including control information and payload data, wherein the control information includes a destination address;
    to forward said packet to the redundancy information calculation unit for calculating a redundancy information,
    to strip said destination address from said packet alter the redundancy information has been calculated,
    to add the redundancy information to the packet,
    to set a control bit in the packet indicating that said destination address is not included in the packet, and
    to forward the packet to the transmission unit.

16. The transmitter according to claim 15, wherein the transmitter is operable to set the control bit in the packet indicating that said destination address is not included in the packet before forwarding said packet to the redundancy information calculation unit.

17. The transmitter according to claim 15, wherein the redundancy information calculating unit is a cyclic redundancy check (CRC) unit.

18. The transmitter according to claim 15, wherein the transmission unit is a wireless transmission unit.

19. The transmitter according to claim 18, wherein the wireless transmission unit operates according to a 802.15.4 standard.

20. The transmitter according to claim 18, wherein the transmitter is part of a transceiver in an integrated circuit having an $I^2C$ interface.

21. The transmitter according to claim 18, further comprising a battery as a power source.

22. A receiver comprising:
    a message reconstruction unit;
    a redundancy information calculation unit coupled with said message reconstruction unit; and
    a receiving unit coupled with the message reconstruction unit, operable to receive a packet including control information, payload data and transmitter redundancy information,
    wherein the message reconstruction unit is operable to determine whether a destination address is included in said control information;

if said destination address is not is included, then the message reconstruction unit is operable to insert an associated address of the receiver into the control information and removing said transmitter redundancy information from said packet;
to forward said packet to said redundancy calculation unit for calculating a receiver redundancy information; and
to compare the receiver redundancy information and the transmitter redundancy information and if they are identically, to accept said packet and otherwise to discard said packet.

23. The receiver according to claim 22, wherein the redundancy information calculation unit is a cyclic redundancy check (CRC) unit.

24. The receiver according to claim 22, wherein the message reconstruction unit determines whether a destination address is included by checking whether a predetermined bit is set in a frame header of the packet.

25. The receiver according to claim 23, wherein the CRC unit is operable to calculate a CRC seed using the inserted address before a packet is fully received.

26. The receiver according to claim 22, further comprising memory to store the transmitter redundancy information.

27. The receiver according to claim 22, further comprising memory to store the inserted associated address.

28. The receiver according to claim 22, wherein the receiving unit is a wireless receiving unit.

29. The receiver according to claim 28, wherein the wireless receiving unit operates with a 802.15.4 standard.

30. The receiver according to claim 22, wherein the receiver is part of a transceiver in an integrated circuit having an I²C interface.

31. The receiver according to claim 28, further comprising a battery as a power source.

32. A transceiver comprising:
a redundancy information calculation unit;
a message assembly and reconstruction unit coupled with said redundancy information calculation unit;
a transceiver unit coupled with the message assembly and reconstruction unit for transmitting and receiving packets,
wherein the message assembly and reconstruction unit is configured for transmission:
to assemble a packet by including control information and payload data, wherein the control information includes a destination address;
to forward said assembled packet to the redundancy information calculation unit for calculating a redundancy information,
to strip said destination address from said assembled packet and to add the redundancy information to the packet,
to set a control bit in the packet indicating that said destination address is not included in the packet; and
to forward the packet to a transmission unit to the transceiver unit; and further configured for reception:
to determine whether said destination address is included in control information of a received packet;
if said destination address is not included, to insert an associated address to the transceiver into the control information and to remove a received redundancy information from said packet;
to forward said packet including said associated address to said redundancy calculation unit for calculating a receiver redundancy information; and
to compare the receiver redundancy information and the received redundancy information and if they are identical, to accept said packet and otherwise to discard said packet.

33. The transceiver according to claim 32, wherein the redundancy information calculating unit is a cyclic redundancy check (CRC) unit.

34. The transceiver according to claim 32, wherein the transceiver unit is a wireless transceiver unit.

35. The transceiver according to claim 34, wherein the wireless transceiver unit operates according to a 802.15.4 standard.

36. The transceiver according to claim 32, further comprising an I²C interface.

37. The transceiver according to claim 32, further comprising a battery as a power source.

38. The transceiver according to claim 32, further comprising memory to store the received redundancy information.

39. The transceiver according to claim 32, further comprising memory to store the inserted associated address.

40. The transceiver according to claim 32, wherein the transceiver is operable to set the control bit in the packet indicating that no destination address is included in the packet before forwarding said packet to the redundancy information calculation unit.

* * * * *

UNITED STATES PATENT AND TRADEMARK OFFICE
CERTIFICATE OF CORRECTION

| | | |
|---|---|---|
| PATENT NO. | : 8,571,021 B2 | Page 1 of 1 |
| APPLICATION NO. | : 12/757709 | |
| DATED | : October 29, 2013 | |
| INVENTOR(S) | : Jozsef G. Nemeth | |

It is certified that error appears in the above-identified patent and that said Letters Patent is hereby corrected as shown below:

In the Claims

Column 12,
Claim 13, line 18 "...transmitted Wirelessly..." ---Change to---
"...transmitted wirelessly..."

Claim 15, line 33 "...to strip said destination address from said packet alter the..."
---Change to--- "...TO STRIP SAID DESTINATION ADDRESS FROM SAID PACKET AFTER THE..."

Column 14,
Claim 32, line 14 "...associated address to the transceiver into the control..." ---Change to---
"...ASSOCIATED ADDRESS OF THE TRANSCEIVER INTO THE CONTROL..."

Signed and Sealed this
Fourth Day of March, 2014

Michelle K. Lee
*Deputy Director of the United States Patent and Trademark Office*